Patented Mar. 8, 1932

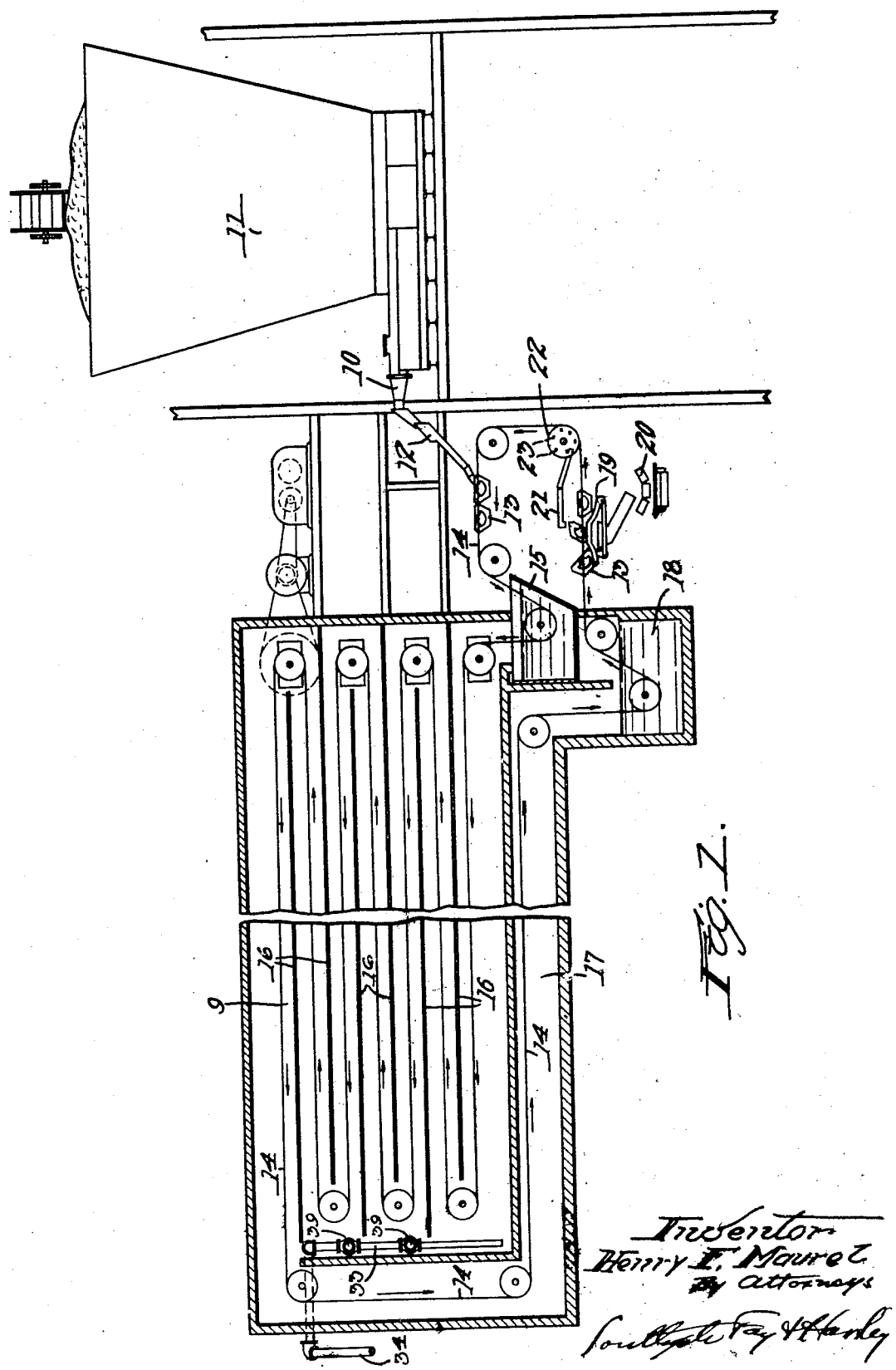

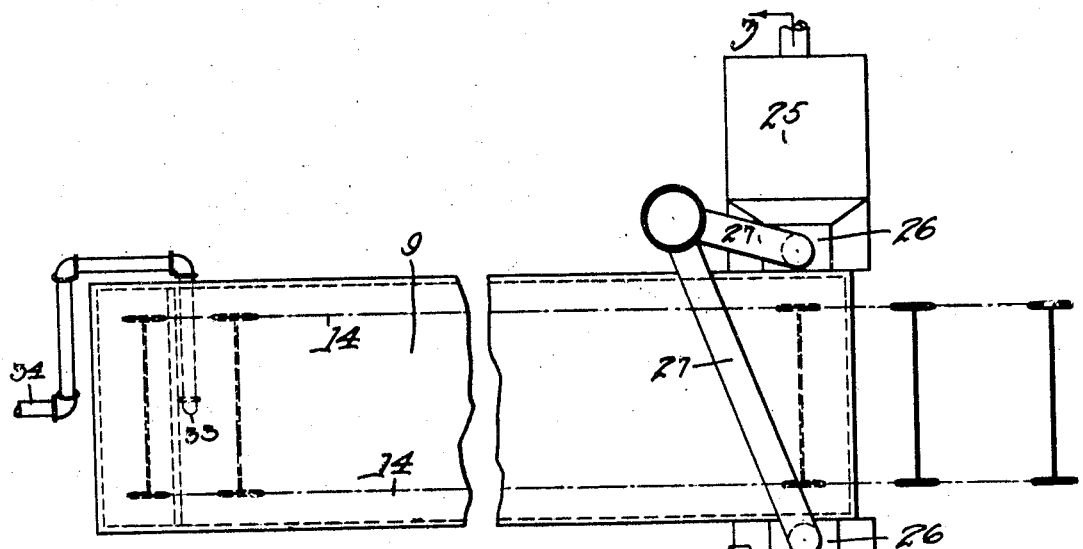

1,848,639

UNITED STATES PATENT OFFICE

HENRY F. MAUREL, OF PROVIDENCE, RHODE ISLAND, ASSIGNOR TO MAUREL INVESTMENT CORPORATION, A CORPORATION OF RHODE ISLAND

OVEN

Application filed February 10, 1927. Serial No. 167,215.

This invention relates to an oven capable of use for various purposes but especially designed for the baking of fuel briquettes.

The principal objects of the invention are to provide an oven in combination with a conveyor so arranged as to subject the briquettes, while traveling on the conveyor, to the necessary degree of heat for a considerable period of time and to so regulate the heat that it will be of just the right temperature to bake the briquettes and not extract any of their heat producing properties; also to provide for heating the oven by a furnace or furnaces, preferably at the side, and preferably by the direct heat of the products of combustion; to provide means whereby the products of combustion entering the oven from the furnaces will be directed into the oven at various points; to supply the direct heat, if desired, to the briquettes as they pass through the oven on the conveyor and at several points along the same; to provide for regulating the amount of heat introduced into the different parts of the oven; to provide means whereby the briquettes can be introduced into the oven and discharged therefrom without loss of heat and in such a way that it is possible for the oven to be operated under negative pressure if desired and also safely and with high efficiency; to provide for cooling the briquettes down partially just before they pass out of the oven; to provide for the regulating of the temperature automatically if desired by diverting the products of combustion; to provide means whereby all the products of combustion may be introduced into the oven or partly by-passed out to facilitate lowering and controlling the temperature when desired; to provide, in combination with the furnace, an instrument to control the introduction of air into the furnace controlled by the percentage of carbon dioxide in the products of combustion; to provide a valve system to control the temperature and pressure in the baking chamber and the amount of carbon dioxide.

Other objects and advantages of the invention will appear hereinafter.

Reference is to be had to the accompanying drawings in which

Fig. 1 is a longitudinal sectional view of an oven constituting a preferred embodiment of this invention, some features being shown in elevation;

Fig. 2 is a plan of the oven and furnace; and

Fig. 3 is a sectional view on the line 3—3 of Fig. 2.

Although capable of many other uses, the oven is particularly adaptable to the baking of fuel briquettes extruded through a nozzle 10 from a hopper 11 in which the fuel is deposited. The briquettes are cut off periodically to furnish them in small lengths and dropped into a chute 12. The chute is arranged to sway back and forth to distribute the briquettes in baskets 13 which are pivotally mounted on endless conveyor chains 14. This conveyor immediately passes down into a liquid seal tank 15 and up out of the same into the oven 9. This oven is of air tight construction adequately insulated. There the conveyor passes back and forth through the oven a plurality of times always going from the bottom toward the top. Between the flights of the conveyor there are a series of horizontal partitions or baffles 16 which divide the oven into compartments. These partitions extend from one end of the oven almost to the other and are arranged to alternate in this respect. The object of the baffles is to isolate each section so as to expedite the removal of vapors generated, the hot products of combustion sweeping them toward the exhaust duct at the rear end. Thus the moisture and oil vapors, whose presence tends to retard the baking, are exhausted swiftly without passing through the other sections. The conveyor finally passes over the top partition 16 with its baskets and down toward the rear end and then back through a cooling zone 17. This zone is a passage insulated from the oven by an inner wall thereof.

The conveyor passes through another liquid seal 18 as it passes out. The baskets are automatically tipped over by a cam arrangement 19 to discharge the briquettes into a conveyor 20 which takes them away. A hammer 21 is used to strike the buckets on the bottom when they are tipped over to loosen any briquettes which are in them. This is operated by a wheel 22 having pins 23 for engaging the end of the hammer as the wheel rotates.

The oven is heated by a pair of furnaces 25 which can be operated with any kind of solid or liquid fuel as may be desired. The products of combustion pass directly into stacks 26 extending upwardly at the sides and if desired can be discharged up pipes 27, these being controlled, if desired, by dampers 28. This is only for the purpose of reducing the amount of heat in the oven, however. Between each stack and the oven is an insulating wall. Normally the products of combustion pass through openings 30 in the insulating walls controlled by dampers 31 into the various compartments of the oven formed by the horizontal partitions 16. These dampers 31 can be operated separately and manually or automatically as desired. The products of combustion necessarily flow inside of the oven between the two partitions from where it is drawn out at the back end. They are discharged at various levels into a duct or pipe 33. Each inlet opening in this pipe or duct is controlled separately by a damper 39 so that their discharge at these several points can be proportioned. From there they are taken out through a pipe 34 and introduced into a condenser. This reduces the pressure to facilitate the flow of gases out the discharge end. They can then be treated in any way to obtain any valuable ingredients.

The operation of the dampers can be controlled by any thermostatic means as may be desired. The admission of air into the furnaces is controlled by a carbon dioxide instrument 35 which operates in accordance with the amount of carbon dioxide in the passage 36 as indicated by the $CO_2$ element 37. This controls the operation of a blower 38 which blows air into the furnace 25 under the grate and also under the stacks 26.

The liquid seals combined with the air-tight construction of the furnace makes it possible to operate under a negative pressure, if desired, with safety and efficiency. The baking process is expedited by introducing, proportioning and isolating the gases from each and every flight of the conveyor in the oven.

The use of the balanced draft system is important as it controls the carbon dioxide in the products of combustion in the oven, the temperature of the baking chamber and the pressure of the gases therein, so as to make all these elements uniform. By being able to by-pass any products of combustion into the pipes 27 an additional control is furnished and a quick way of cooling down the oven when necessary. By causing the briquettes to pass back and forth horizontally through the over repeatedly and partitioning the oven above and below each two flights of the conveyor, the thorough heating of all the briquettes at all times is provided for. By bringing the conveyor down into a lower zone, that is not directly heated but is in fact insulated from the heating zones, the briquettes are cooled before they are taken out through the second liquid seal. By placing the element 37 at the point of discharge of the furnaces into the oven and controlling the blower by the instrument in accordance with the amount of carbon dioxide present, the percentage of air introduced into the furnace is controlled so as to keep the carbon dioxide content of the products of combustion practically constant as they enter the furnace.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. The combination with a baking oven for fuel briquettes, a conveyor passing through the oven back and forth a plurality of times, the oven having horizontal partitions extending from one end nearly to the other in two alternating series between the strands of the conveyor, means for driving the conveyor, and baskets pivotally mounted upon the conveyor for carrying the material to be acted upon, of a furnace at the side of the conveyor adapted to discharge its products of combustion into the oven, the oven having a vertical stack for receiving them and an insulating wall for insulating the oven from said stack, said wall being provided with openings having dampers therein for controlling the discharge of the products of combustion from the stack into the oven.

2. The combination with an oven for baking fuel briquettes, and an endless conveyor having two horizontal strands outside the oven, one for receiving the material to be baked and the other for discharging it, said conveyor extending into the bottom of the oven from the former and extending out from the oven to the latter, the conveyor being provided with pivoted baskets depending below the conveyor from their pivots for receiving the material to be baked, of means outside the oven adjacent the said discharge strand for tilting the baskets over on their pivots at a point where the discharge strand is horizontal, and a hammer timed with the operation of the conveyor for delivering a blow to the back of each basket when tipped up to insure discharge of the contents.

3. The combination of a baking oven for fuel briquettes, and a conveyor in the oven for passing the briquettes through the oven back and forth a plurality of times, of a furnace at the side of the oven, a vertical stack directly connected with the furnace for receiving the products of combustion therefrom and located in contact with the side of the oven, an insulating wall for insulating the oven from the stack having openings at different levels from the stack into the oven, dampers in said openings for controlling the discharge of heated products of combustion into the oven, the stack discharging at the top, and a damper in the discharge for controlling the discharge of the products of combustion into the oven.

4. The combination with an oven for baking fuel briquettes and an endless conveyor having two horizontal strands outside the oven, one over the other, of means for depositing the material to be baked on the top one, means for discharging the material after baking from the lower one, said upper strand of the conveyor extending into the oven near the bottom, and said lower strand extending out of the oven at a lower point, the conveyor being provided with pivoted baskets extending below the conveyor from their pivots for receiving the material to be baked, and means outside the oven adjacent to the lower discharge strand for positively tilting the baskets over on their pivots as soon as they emerge from the oven at a point where the discharge strand is horizontal for discharging the contents.

In testimony whereof I have hereunto affixed my signature.

HENRY F. MAUREL.